United States Patent [19]

Beasley

[11] Patent Number: 5,320,053
[45] Date of Patent: Jun. 14, 1994

[54] DEMOUNTABLE ROTARY CAM FOR TUFTING MACHINE

[75] Inventor: Max M. Beasley, Chattanooga, Tenn.

[73] Assignee: Tuftco Corp., Chattanooga, Tenn.

[21] Appl. No.: 767,854

[22] Filed: Sep. 30, 1991

[51] Int. Cl.[5] ............... D05C 15/20; G05G 1/00; F16C 3/04

[52] U.S. Cl. ............... 112/80.42; 74/570; 403/344; 112/221

[58] Field of Search ............... 403/344, 356; 74/567, 74/568 R, 595, 596, 597, 598, 579, 600, 601, 570, 571 R, 571 L, 571 M; 112/80.42, 314, 315, 221; 384/273, 542

[56] References Cited

U.S. PATENT DOCUMENTS

| | | | |
|---|---|---|---|
| 394,407 | 12/1888 | Sibley et al. | 403/344 X |
| 565,169 | 8/1896 | Linstrom | 74/570 |
| 639,133 | 12/1899 | Ball | 403/344 |
| 653,313 | 7/1900 | Raifsnyder | 403/344 |
| 790,892 | 5/1905 | Handley | 74/570 |
| 793,922 | 7/1905 | Deutsch | 403/344 |
| 815,232 | 3/1906 | Taylor | 74/571 M |
| 825,428 | 7/1906 | Spencer | 403/344 X |
| 979,207 | 12/1910 | Sasaman | 403/344 X |
| 1,054,883 | 3/1913 | Vale | 74/570 |
| 1,875,180 | 8/1932 | Rider | 74/570 X |
| 2,453,072 | 11/1948 | Johnson | 74/571 M |
| 2,977,905 | 4/1961 | Cobble, Sr. et al. | |
| 3,653,346 | 4/1972 | Parsons | 403/344 X |
| 3,839,972 | 8/1974 | Scott et al. | |
| 3,857,345 | 12/1974 | Higgins | |
| 3,871,311 | 3/1975 | Ciccior et al. | 112/200 |
| 4,515,096 | 5/1985 | Ingram | |
| 4,619,545 | 10/1986 | Küttenbaum | 403/344 X |
| 4,653,344 | 3/1987 | Nelsen | 74/570 |

FOREIGN PATENT DOCUMENTS

| | | |
|---|---|---|
| 320377 | 7/1928 | United Kingdom |
| 744821 | 10/1953 | United Kingdom |
| 742141 | 5/1954 | United Kingdom |

OTHER PUBLICATIONS

1957 Singer Tufting Machine Manual, p. 11.
Tuftco Corporation Decal "Adjusting Needle Drive Mechanisms".

Primary Examiner—Clifford D. Crowder
Assistant Examiner—Paul C. Lewis
Attorney, Agent, or Firm—Douglas T. Johnson

[57] ABSTRACT

This disclosure relates to a demountable rotary cam with upper and lower portions that can be coupled and securely mounted on a rotatable shaft, and can also be demounted and interchanged with other similar eccentrics having different throws. The demountable rotary cam is particularly suited to vary the stroke of the needle bar in a tufting machine and an adjusting means is provided to maintain the proper relationship between the needles and loopers over a range of strokes.

6 Claims, 3 Drawing Sheets

DEMOUNTABLE ROTARY CAM FOR TUFTING MACHINE

BACKGROUND OF THE INVENTION

This invention pertains to demountable cams or eccentrics, and more particularly to demountable cams of varying throw lengths which can be easily interchanged to alter the length of the stroke of the needle bar in a tufting machine, including an adjusting means for maintaining the position of the bottom of the stroke.

In some manufacturing applications, it is desirable to be able to vary the stroke of connecting rods, which are imparted with longitudinal motion by the shape of an eccentric on a rotating shaft or axis. It is particularly desirable to be able to change the length of the needle stroke of tufting machines, and to be able to make such a change without the necessity for removing the entire driveshaft of the machine. In tufting machines, one or more rows of yarn carrying needles are reciprocally driven through a backing material fed through the machine across a bed plate to form loops that are seized by loopers oscillating below the backing material and bed plate in timed relationship with the needles. To change the depth of pile height produced by a tufting machine, it is necessary to change the length of the stroke of the needle, and the elevation of the bed plate relative to the loopers, as is well known in the art and described in U.S. Pat. No. 2,977,905. The actual bottom point of the stroke of the needle must remain constant so that the loopers and needles retain their proper relationship. Otherwise, the loopers will not properly seize the loops of yarn from the needles. To maintain this relationship a variety of methods have been utilized including interchanging push rods, or connecting rods of varying lengths; using shims; or using adjustable length push rods or connecting rods. In order to properly maintain the relationship between the needles and loopers, changes to the length of the needle stroke as well as the attendant adjustments are generally performed with the tufting machine at bottom dead center of the needle stroke.

Changing the stroke in high speed tufting machines has previously been accomplished by two general constructions. In one construction, the eccentrics are adjustable. The most widely used adjustable eccentrics involve two non-adjustable hubs which can be clamped tightly against the eccentric. When the hubs are loosened, the eccentric can be adjusted to alter its throw. Other types of adjustable eccentrics have generally either involved too many parts and adjustments to make changes in stroke length quickly and correctly, or have lacked the structural stability required to withstand the radial forces of driving the connecting rod and needle assembly at high speeds. Examples of such adjustable eccentrics are illustrated in U.S. Pat. Nos. 3,857,345 and 4,515,096. In the other general type of construction, two eccentrics of different throws are mounted on the rotating shaft adjacent to each connecting rod. To adjust the stroke, the eccentric strap is loosened and the eccentric with the desired throw is engaged. This leaves unused eccentrics mounted on the rotating shaft.

In tufting machines using either type of construction, there are a considerable number of eccentrics on each machine because there is an eccentric for each push rod, and there may be from 8 to 12 push rods in a full size tufting machine. Each time a stroke adjustment must be made, it is necessary to make adjustments at each push rod internal of the tufting machine head, and the head of the machine must be opened and substantially disassembled for changes to be performed. Because of the expense due to the number of parts involved, as well as the machine down-time involved in adjusting the eccentrics, these mechanisms are generally only used for specialized or high speed machines. In tufting machines that operate at higher speeds, it is desirable to reduce the vibration and rotating mass of the drive mechanism.

In the constructions utilizing adjustable eccentrics a great deal of undesirable weight is added to the drive shaft by the two hubs which support the eccentric. This is aggravated by the need to add different balancing weights depending upon the setting of the eccentric to minimize the vibration attendant to high speed rotation. The weight on the drive shaft may be further increased by the addition of "dummy" push rods that operate in opposite reciprocation with the actual push rods so that the force necessary to power the machine remains fairly constant, with resulting smoother operation. The aggregate weight places tremendous stress upon the main driveshaft with a corresponding reduced useful life for the shaft or the need to use a stronger and more expensive shaft.

A substantial amount of undesirable weight also is added to the drive shaft in the constructions using a plurality of cams for each push rod, because the unused cams remain on the driveshaft. In addition, as only two cams can reasonably be placed on the driveshaft for each push rod, the possible adjustments are limited to only two throw lengths.

SUMMARY OF THE INVENTION

It is the primary object of this invention to provide a means by which the throw of an eccentric on a rotating shaft can be changed without adding unnecessary weight to the shaft.

When the throw of an eccentric is used to vary the length of the needle stroke of a tufting machine, it is a further object of the invention to provide an adjusting means for maintaining the proper relationship between the needles and the loopers.

The present invention is also concerned with an eccentric which may be disassembled from and reassembled on a rotatable shaft without disengaging the shaft from its mounting and drive assembly, with means to securely engage the eccentric with the rotatable shaft, with guide means for operably engaging a connecting rod, and with means to prevent lateral movement between the components of the eccentric in response to radial forces.

Accordingly, the present invention provides an eccentric with upper and lower portions that can be coupled and securely mounted upon a rotatable shaft, and can also be demounted, and interchanged with other similar eccentrics having different throws. In the preferred embodiment of the invention, the upper portion and lower portion of the eccentric are divided along the line running through the axis of rotation of the eccentric perpendicular to the line of the throw. In the preferred embodiment the upper and lower portions are coupled together by bolts, securely engaged to the rotatable shaft by a key and shaft clamping block, and with a plurality of dowels further interlocking the upper and lower portions against lateral movement.

DESCRIPTION OF THE PREFERRED EMBODIMENTS

Figure 1:
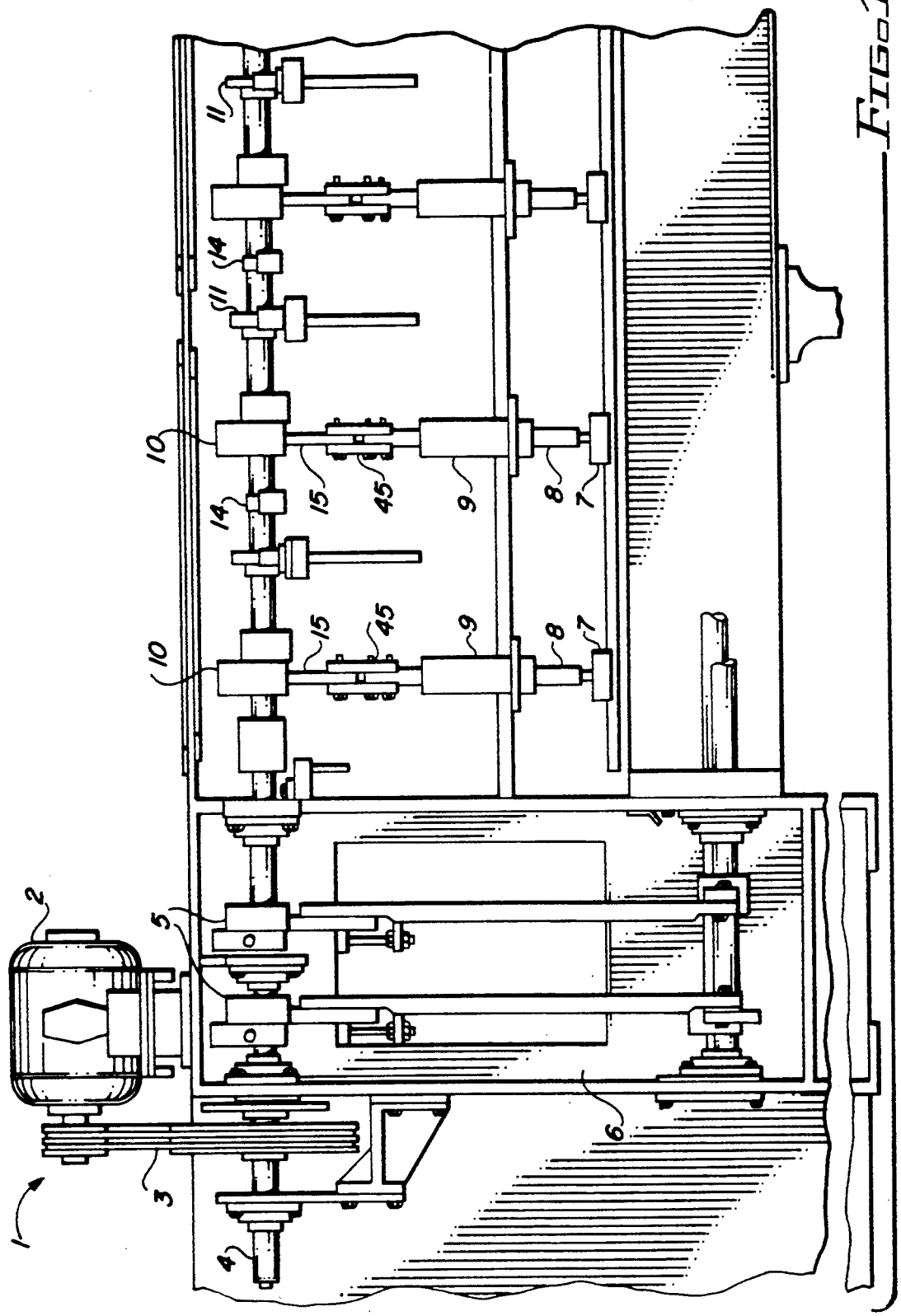
FIG. 1 illustrates a partial sectional side view of a tufting machine embodying the present invention.

Referring to FIG. 1, a tufting machine 1 is illustrated as having a power source 2 and belts 3 to a main driveshaft 4. The main driveshaft 4 may serve to drive looper and knife mechanisms by using eccentric cams 5, as well as powering backing fabric and yarn drives by variable pulleys which are not shown, or by other conventional means all of which are well known in the art. These drive mechanisms are usually contained in the end cabinet 6 of the tufting machine. Of primary concern to the present invention are one or more needle bars 7 which are connected by push rods s that are driven in a reciprocating manner in guide bearings 9 by connecting rods 15. The connecting rods 15 are in turn driven by eccentrics 10 mounted on the rotating driveshaft 4. The driveshaft 4 also passes through a plurality of supporting bearings 11.

Moveable counterweights 14 are mounted on the driveshaft in proximity to the eccentrics 10 and connecting rods. These counterweight are mounted offset approximately 180 degrees from the throw of the eccentrics 10 to provide rotational balance to the driveshaft 4. The counterweights 14 may be adjusted as necessary to improve balance and minimize vibration.

As briefly discussed above, driveshafts having eccentrics or cams have been used in tufting machines with connecting rods supported thereon so that as the driveshaft rotates, the connecting rods will impart a reciprocating motion to an attached push rod. The length of the stroke of the push rod, to which the needle bar is connected, is dependent upon the amount of eccentricity of the cam. As the requirements for longer needle strokes become more desirable, as when tufting shag type or long nap fabrics, it becomes necessary to, both increase the eccentricity of the cams, and raise the bed plate supporting the fabric backing. Similarly, when shorter needle strokes are more desirable, it becomes necessary to, both reduce the eccentricity of the cams, and lower the bed plate supporting the fabric backing. When the needle stroke is adjusted, it is also necessary to make corresponding adjustments so that the relationship of the needles and loopers is not altered.

Figure 3:
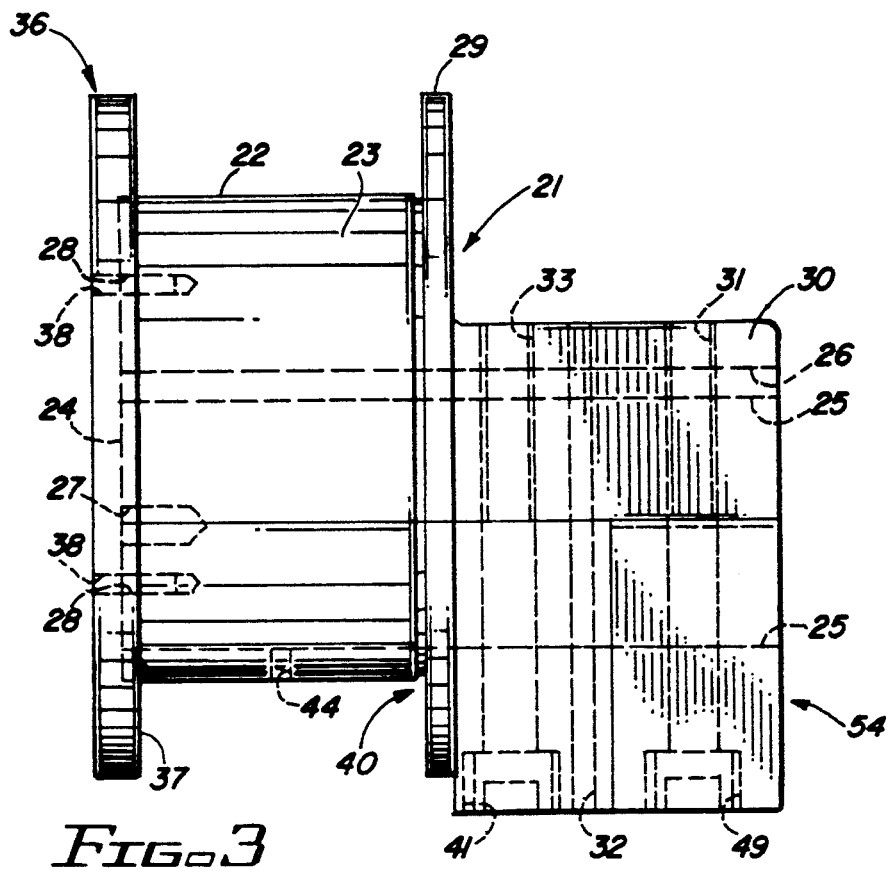
FIG. 3 is a side elevation view of an embodiment of the invention.
Figure 4:
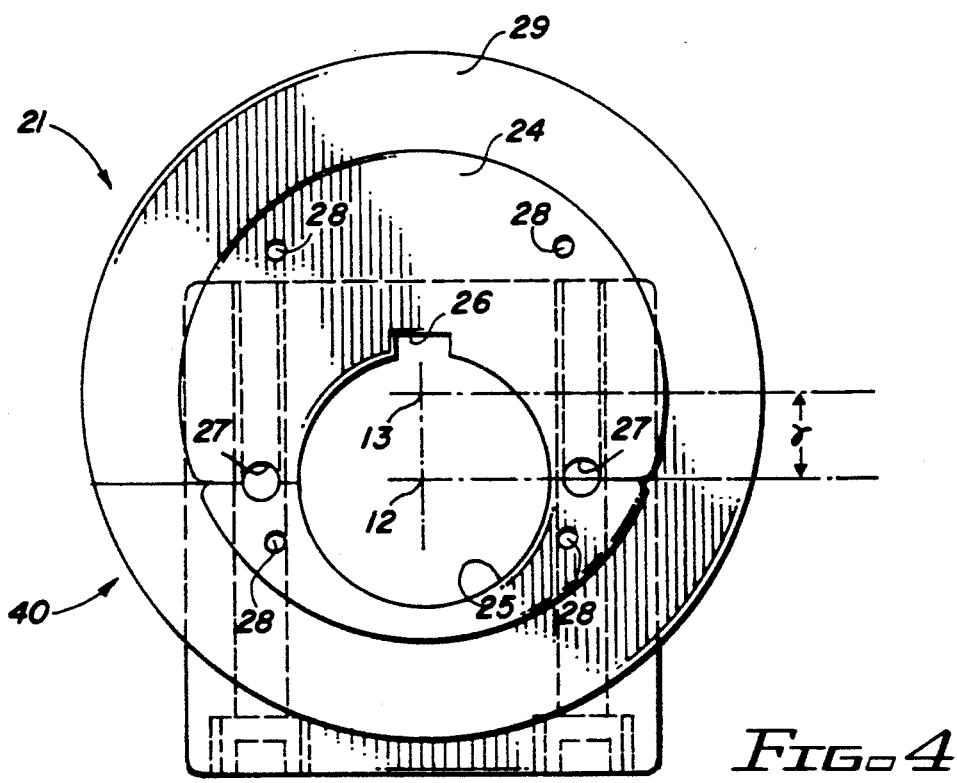
FIG. 4 is a front elevation view of an embodiment of the invention, with the coverplate removed.

In accordance with the present invention, cams of a desired eccentricity can be selected and mounted upon the driveshaft without the necessity of removing the driveshaft or using the heavier and more complicated adjustable cams with settings for variable eccentricities. In the embodiment of the present invention shown in FIG. 2, the driveshaft 4 is castellated with keys 63 in the positions where the eccentrics are mounted. The driveshaft 4 is also shown with a duct 61 whereby oil is pumped through the driveshaft and some oil flows through the opening 62 located on the driveshaft approximately opposite the key 63. As shown in FIGS. 3-4, an axial bore 25 through the cam is of sufficient diameter to receive the driveshaft. The center of the bore 12 is offset from the center 13 of the cylindrical segment of the cam by the desired eccentricity or throw $\gamma$.

Figure 2:
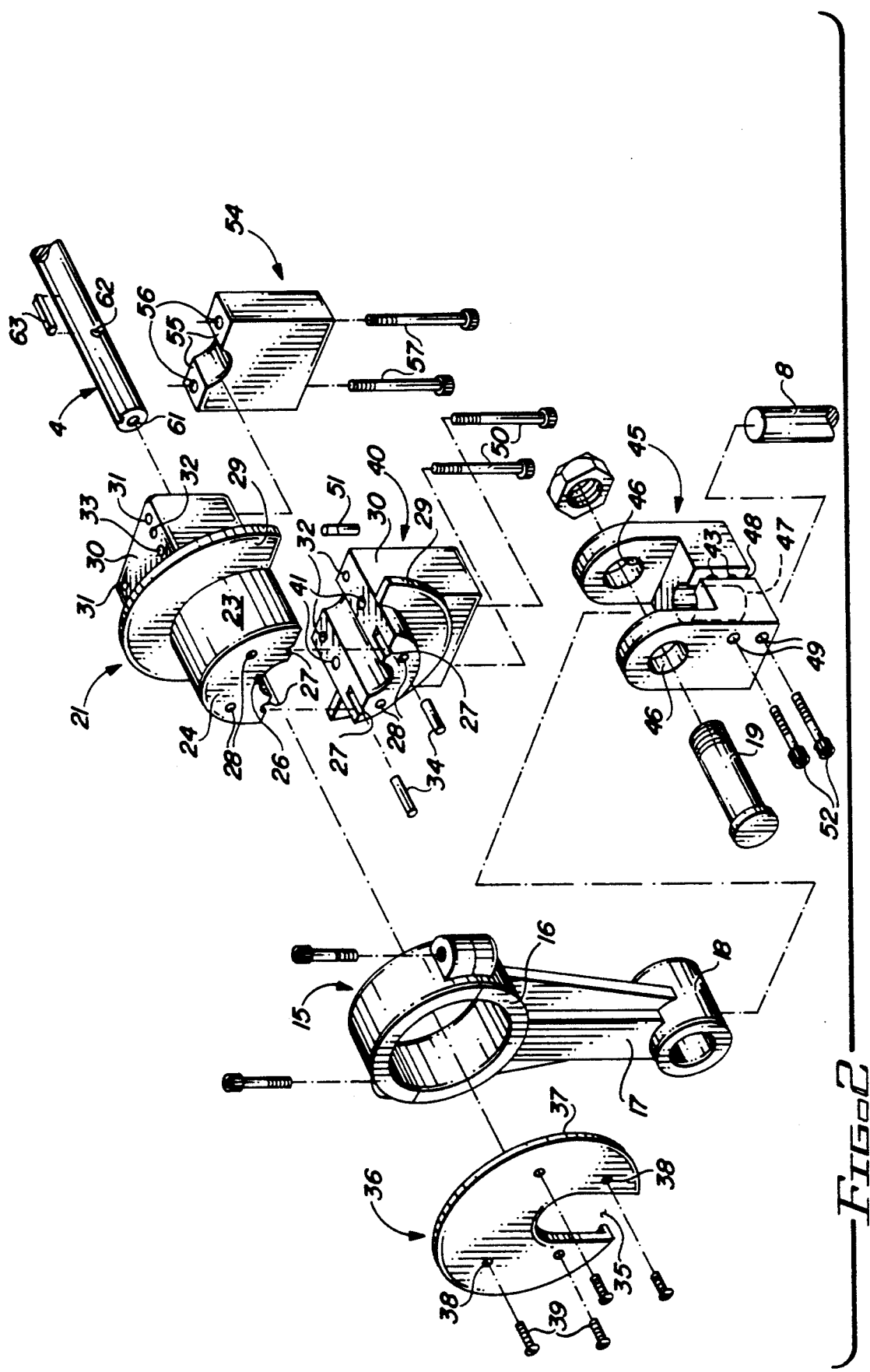
FIG. 2 illustrates an exploded perspective view of embodiment of the invention.

With reference to FIG. 2, it will be seen that the cam is divided into an upper portion 21 and a lower portion 40. In the preferred embodiment shown, the longitudinally or axially distal end of the lower portion is a separate shaft clamping block 54. The upper portion 21 of the cam is preferably divided from the lower portion 40 and shaft clamping block 54 along the plane passing through the diameter of the bore perpendicular to the throw $\gamma$ (illustrated in FIG. 4). A coupling means is provided to allow the upper and lower portions to be mounted about a rotatable shaft such as the illustrated threaded holes 33 in the upper portion to receive bolts 50 through aligned holes 41 on the lower portion 40. While the bolts 50 serve primarily to fasten the upper portion 21 and lower portion 40 about the driveshaft 4, this means also provides some resistance to lateral movement between the upper and lower portions.

Generally referring to FIG. 3, it will be seen that the assembled cam 10 consists of a guide means for operably engaging a connecting rod such as a coverplate 36 and a raised annular flange 29 oppositely positioned around a cylindrical segment 22 with a journal surface 23; and an external clamping shoulder 30.

As illustrated in FIG. 2, a means to restrict lateral movement between the upper and lower portions is provided such as aligned dowel holes 27, 32 in the upper and lower portions to receive dowels 34, 51. Dowel holes 27 in the cylindrical segment of the eccentric are preferably aligned parallel to the bore and along the plane separating the upper and lower portions of the cam, to receive dowels 34. The exposed face of the cylindrical segment of the eccentric 24 has a plurality of screw holes 28 so that an annular coverplate 36 with aligned screw holes 38 may be affixed with screws 39 and thereby guide the eccentric strap 16 of the connecting rod 15 on the journal 23 between the coverplate 36 and flange 29. The coverplate 36 also has a notch 35 to allow it to fit over the driveshaft 4 in connection with cams possessing a wide range of eccentricities. In its preferred embodiment, the side 37 of the coverplate which rests against the exposed face of the cylindrical segment is countersunk or recessed in a size exactly matching the exposed face of the cylinder. In this fashion both the dowels and coverplate act as further means to restrict lateral movement between the upper portion and the lower portion of the eccentric which would otherwise occur due to the varying radial forces upon the cam during its rotational cycle.

FIG. 2 also illustrates a means for rotationally securing the eccentric to the driveshaft, namely a keyway 26 in the bore which receives the key 63 on the driveshaft 4. A small aperture 44 (illustrated in FIG. 3) extends between the bore of the lower portion 40 and the journal surface 23 which allows oil from the opening 62 in the driveshaft to reach and lubricate the journal 23 bearing.

Continuing to refer to FIG. 2, in the preferred embodiment of the invention, the shaft clamping block 54 has a plurality of holes 56 aligned with threaded holes at the axially distal end of the external clamping shoulder 30 of the upper portion 21 to receive bolts 57 that will attach the shaft clamping block to the upper portion around the driveshaft 4. The shaft clamping block is provided with a means to restrict longitudinal or axial movement of the eccentric along the driveshaft. As an example of the restricting means, specifically illustrated are abutting members 55 on either side of the bore of the shaft clamping block 54 which are slightly shorter than the abutting members of the upper portion 21 and lower portion 40. Accordingly, when the shaft clamping block 54 is fastened to the upper portion 21, the driveshaft 4 is securely grasped so that longitudinal movement of the cam along the driveshaft is prevented.

A further feature of the invention illustrated in FIG. 2 is an adjustable clevis 45 which attaches the connecting rod 15 to the push rod 8. The connecting rod 15 consists of the eccentric strap 16, the eccentric rod 17, and the wrist 18. The wrist 18 of the connecting rod is articulately joined with the proximate end of the clevis 45 by the wrist pin 19. The distal end of the clevis 45 has an adjustable means of coupling with the push rod 8 so that the relationship between the needles and loopers need not change even when the tufting machine is used with eccentrics of varying throws and correspondingly varied lengths of the needle stroke. The distal end has a channel 47 to receive the push rod 8. A slit 48 separates the two confining walls of the channel, and the width of the slit 48 and corresponding pressure of the channel walls upon the push rod can be increased by tightening the bolts 52 which pass through holes 49 in one channel wall and are received in threaded holes 43 in the other channel wall.

In operation, when the eccentric 10 is changed, with the needle bar 7 at bottom dead center, the bolts 52 in the channel walls of the distal end of the clevis 45 are loosened until the clevis slides freely on the push rod 8. After the desired eccentric is assembled on the drive shaft 4 and the connecting rod 15 is securely mounted upon the journal surface 23 by attaching the coverplate 36, the push rod 8 is necessarily received within the channel 47 of the clevis 45 the proper distance to maintain the correct relationship between the needles and loopers. The bolts 52 in the channel walls of the distal end of the clevis are tightened to securely grip the push rod s in this position.

Numerous alterations of the structure herein disclosed will suggest themselves to those skilled in the art. It will be understood that the details and arrangements of the parts which have been described and illustrated in order to explain the nature of the invention are not to be construed as any limitation of the invention. All such alterations which do not depart from the spirit of the invention are intended to be included within the scope of the appended claims.

I claim:

1. A demountable rotary cam comprising:
    a bore passing through the cam;
    an upper portion;
    a lower portion divided from the upper portion along a plane passing through the diameter of the bore of the cam;
    a means for coupling the upper portion and the lower portion about a rotatable shaft that passes through the bore;
    a means for securing the cam to the rotatable shaft;
    a guide means for operably engaging a connecting rod wherein both the upper portion and the lower portion are further comprised of a cylindrical segment for engaging the connecting rod and a shoulder external of said cylindrical segment for receiving the coupling means; and
    wherein the shoulder of the lower portion has an axially proximate end adjacent to the cylindrical segment and an axially distal end, and the means for securing the cam to the rotatable shaft comprises a shaft clamping block at the axially distal end of the shoulder of the lower portion.

2. In a tufting machine having a rotatable driveshaft, a connecting rod operably connected thereto for reciprocating movement, a push rod driveable reciprocally by said connecting rod, a needle bar driveable reciprocally by said push rod, a rotary cam mounted on the rotatable driveshaft for regulating the stroke of said ncedle bar, and an adjusting means for maintaining the bottom dead center position of the needle bar regardless of the variation in stroke effected for said needle bar, wherein the improvement is characterized by said rotary cam further comprising:
    a bore passing through the cam;
    an upper portion;
    a lower portion divided from the upper portion along a plane passing through the diameter of the bore of the cam;
    a means for coupling the upper portion and the lower portion about the rotatable driveshaft that passes through the bore;
    a means for securing the cam to the rotatable driveshaft;
    a guide means for operably engaging a connecting rod comprising a detachable coverplate having a notch permitting said detachable coverplate to fit over the rotatable driveshaft, and a raised flange; and
    a means to restrict lateral movement between the upper and lower portions, comprising said detachable coverplate.

3. In a tufting machine having a rotatable driveshaft, a connecting rod operably connected thereto for reciprocating movement, a push rod driveable reciprocally by said connecting rod, a needle bar driveable reciprocally by said push rod, a rotary cam means mounted on the rotatable driveshaft for regulating the stroke of said needle bar, and an adjusting means for maintaining the bottom dead center position of the needle bar regardless of the variation in stroke effected for said needle bar, wherein the improvement is characterized by said rotary cam means further comprising:
    a bore passing through the cam;
    an upper portion;
    a lower portion divided from the upper portion along a plane passing through the diameter of the bore of the cam;
    a means for coupling the upper portion and the lower portion about the rotatable driveshaft that passes through the bore;
    a means for securing the cam to the rotatable driveshaft; and
    a guide means for operably engaging a connecting rod wherein both the upper portion of the rotary cam and the lower portion have a cylindrical segment for engaging the connecting rod and a shoulder external of said cylindrical segment for receiving the coupling means, said shoulder having and end proximate to said cylindrical segment and an opposite axially distal end; and
    wherein the means for securing the rotary cam to the rotatable shaft comprises a shaft clamping block at the axially distal end of the shoulder of the lower portion.

4. A demountable rotary cam comprising:
    a bore passing through the cam;

an upper portion;

a lower portion divided from the upper portion along a plane passing through the diameter of the bore of the cam;

a means for coupling the upper portion and the lower portion about a rotatable shaft that passes through the bore;

a means for securing the cam to the rotatable shaft; and a guide means for operably engaging a connecting rod comprising a detachable cover plate having a notch permitting said detachable coverplate to fit over the rotatable driveshaft and a raised flange;

wherein both the upper portion and the lower portion are further comprised of a cylindrical segment for engaging the connecting rod and a shoulder external of said cylindrical segment for receiving the coupling means.

5. A method for regulating the stroke of a needle bar in a tufting machine having a rotatable driveshaft, a first demountable cam of relatively short throw mounted to said rotatable driveshaft, a connecting rod operably connected thereto for reciprocating movement, a push rod driveable reciprocally by said connecting rod, a needle bar driveable reciprocally by said push rod, and an adjusting means for maintaining the bottom dead center position of the needle bar regardless of the variation in stroke effected for said needle bar comprising:

removing the connecting rod from said first demountable cam;

uncoupling an upper portion of said first demountable cam from a lower portion of said first demountable cam;

removing the upper portion and the lower portion of said first demountable cam from the rotatable driveshaft;

inserting an upper portion and a lower portion of a second demountable cam of relatively long throw on the rotatable driveshaft;

coupling the upper portion of said second demountable cam to the lower portion of said demountable cam about the rotatable driveshaft;

mounting the connecting rod on said second demountable cam; and calibrating the adjusting means so that the bottom dead center position of the needle bar is maintained after the variation in stroke effected by insertion of the second demountable cam.

6. A method for adjusting the stroke of a needle bar in a tufting machine according to claim 5 wherein:

said first demountable cam is of relatively long throw; and said second demountable cam is of relatively short throw.

* * * * *